United States Patent

Hartl

[15] 3,648,779
[45] Mar. 14, 1972

[54] SOD ROLL FORMING MACHINE

[72] Inventor: John J. Hartl, 2200 2nd St. N.W., Cedar Rapids, Iowa

[22] Filed: Mar. 11, 1970

[21] Appl. No.: 18,485

[52] U.S. Cl. .............................................. 172/19, 172/245
[51] Int. Cl. ........................................................ A01b 45/04
[58] Field of Search ........................ 198/9, 165; 172/19, 20; 214/83.26

[56] References Cited

UNITED STATES PATENTS

| | | | |
|---|---|---|---|
| 2,778,292 | 1/1957 | Kavan | 172/260 |
| 3,053,328 | 9/1962 | Geipel | 172/19 |
| 3,485,304 | 12/1969 | Daymon | 172/19 |
| 2,663,242 | 12/1953 | Lancaster | 172/19 |
| 2,998,081 | 8/1961 | Hartmangruber et al | 172/20 |
| 3,164,211 | 1/1965 | Scott | 172/19 |
| 3,235,011 | 2/1966 | Pasinski | 172/19 |
| 3,498,386 | 3/1970 | Daymon | 172/19 |
| 3,499,492 | 3/1970 | Daymon | 172/19 |

*Primary Examiner*—Robert E. Pulfrey
*Assistant Examiner*—C. W. Hanor
*Attorney*—Haven E. Simmons and James C. Nemmers

[57] ABSTRACT

A machine for rolling adjacent strips of precut sod into easily handled rolls and conveying the rolls to the side of the machine for discharge into a vehicle for transportation to the job site. The machine is adapted so that it can be operated in either a forward or reverse direction thus facilitating the removal of the precut sod particularly in small or enclosed fields.

9 Claims, 10 Drawing Figures

PATENTED MAR 14 1972

INVENTOR.
JOHN J. HARTL
BY James C. Nemmers
ATTORNEY

INVENTOR.
JOHN J. HARTL
BY
ATTORNEY

INVENTOR:
JOHN J. HARTL

BY James C. Nemmers

ATTORNEY

SOD ROLL FORMING MACHINE

BACKGROUND OF THE INVENTION

The development of subdivisions of new homes, and the construction of apartments and suburban commercial buildings, has created a demand for the use of sod, since such areas are normally graded thus destroying what ground cover may have existed. Because of the increased demand for sod, machines have been developed to cut sod in strips of a predetermined length. Once the sod is cut from a field, it must be rolled and then lifted onto a truck or other vehicle for transportation to the site where it will be used. The sod, of course, must be rolled and laid at the new site promptly or it will become dried out and the grass will die. The strips of precut sod can be manually rolled and lifted onto a vehicle, but the rolled strips are quite heavy and can be awkward to handle. Machines have, therefore, been designed to do this heavy and difficult work of rolling the precut strips. However, the machines known to me are capable of handling only a single strip of cut sod, and they provide no means for conveying the sod to a position where it can be easily and with a minimum of effort unloaded onto the bed of a truck. Moreover, the machines known to me for harvesting sod are difficult to operate in small or enclosed fields and therefore the sod which has been cut around the edge of the field often must be manually handled.

SUMMARY OF THE INVENTION

Applicant's machine will simultaneously roll two adjacent strips of precut sod, pick them up, and convey them upwardly and to the side so that they can be easily loaded into a truck or other vehicle moving alongside of the machine. The machine is self-propelled, and is adapted so that it can be towed over the road without violating laws imposing width limitations. When at the sod field, the machine can be driven in either direction, with a reversal of direction accomplished within a few minutes and with a minimum of ease. The machine of the invention accomplishes this with the utmost simplicity to minimize operating problems and maintenance.

The above and other features of the invention will become evident from the detailed description herein when taken in connection with the following identified drawings.

DESCRIPTION OF THE PREFERRED EMBODIMENT

Figure 1:
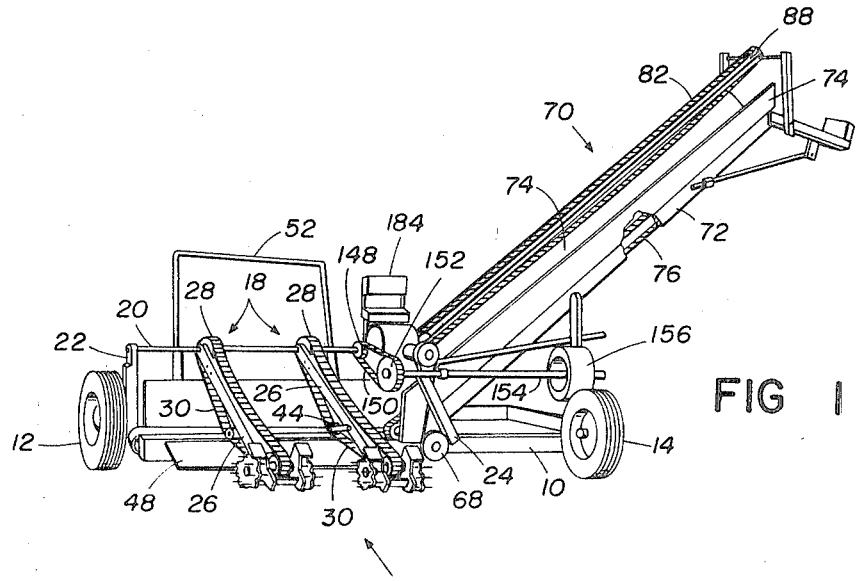
FIG. 1 is a perspective view of the machine showing the components of the machine positioned to convey the rolled sod to the right as the machine moves along the precut strips of sod.

The machine is mounted on a chassis 10 which is supported on three wheels, a "front" wheel 12 and two "rear" wheels 14 and 16. The front wheel 12 has its axle fixed relative to the chassis 10, but the entire wheel-axle assembly is easily removable so that the machine can be towed as a trailer on the rear wheels 14 and 16 when the vehicle is moved over the road. When being towed, the wheels 14 and 16 must be turned 90° from their positions as shown in FIG. 1 of the drawings. The mounting which permits this is described more fully hereinafter, but for purposes of the present description the wheels are shown in their positions which allow the machine to be operated as a self-propelled vehicle in the field.

The mechanism to roll the precut strips in each of two adjacent rows of sod are substantially identical and each of them is indicated in FIG. 1 by the reference numeral 18. Each of the sod rollers 18 has its upper end mounted on a shaft 20 that is supported on one end by an upright frame member 22 and on its other end (the right in FIG. 1) by frame member 24. Each of the sod roller mechanisms has a rigid arm 26 the upper end of which is connected to the shaft 20 in such a manner that the shaft 20 is free to rotate and the arm free to pivot on the shaft. For this purpose, the arms 26 may be mounted on the shaft 20 by bushings or other suitable means (not shown).

Figure 2:
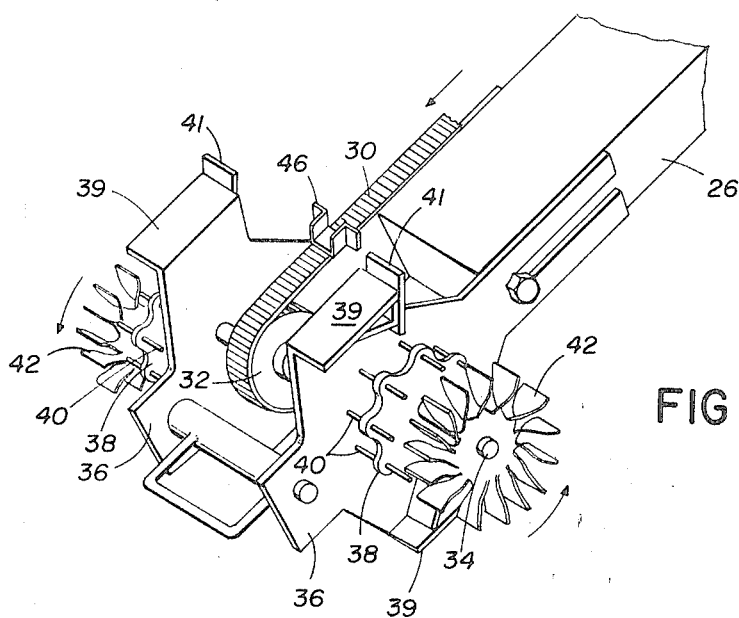
FIG. 2 is an enlarged view in perspective showing a portion of the mechanism by which the precut strips of sod are rolled.

Each end of each arm 26 is bifurcated, and between the bifurcations at the upper end of each arm there is received a sprocket 28 which is keyed or otherwise affixed to the shaft 20 so as to be rotatable therewith. The sprocket 28 is connected by endless chain 30 to a sprocket 32 affixed to a shaft 34 that extends transversely through the bifurcations 36 at the lower end of the arm 26, the sprocket 32 being positioned between the bifurcations 36 as best seen in FIG. 2. The shaft 34 extends beyond each of the bifurcations 36 and has affixed to each of its outer ends a rotatable disk 38 which has a plurality of axially extending pins 40 secured to it around its periphery. In addition, there may be secured to each of the outer ends of the shaft 34 a paddle wheel 42 although I have found that the use of such a paddle wheel is not absolutely necessary to operation of the mechanism. About midway between the ends of each arm 26 there is provided an idling roller 44 (FIG. 1) which engages the inside surface of the chain 30 and maintains the chain tight for a purpose that will be evident from the function of the chain arrangement.

Mounted above and below each of the disks 38 is a shoe 39 which has adjustably secured to one end a lifter plate 41. The amount which the plate 41 extends beyond the surface of shoe 39 can be varied so that the plates 41 of the shoes 39 resting on the ground will engage the end of a precut strip of sod to lift it and start the sod roll.

From the description thus far of the sod roller mechanism, it will be obvious that as shaft 20 rotates, the disks 38 and paddle wheels 42 at the lower ends of arms 26 will be rotatably driven by chain 30 in the direction of the arrows of FIG. 2. As shown in FIG. 1, the shoes 39 of the sod roller mechanisms 18 rest on the ground, and the two mechanisms are spaced apart according to the spacing of the precut strips of sod. When the disks 38 and paddle wheels 42 are rotated, and come into engagement with a precut strip of sod, the end of which has been lifted by plates 41, the rotating movement of the disks 38 and paddle wheels 42 will, as the machine moves forwardly, cause the strip of sod to start rolling up. As the strip starts to form a roll, the roll will come into engagement with the chain 30 the upper run of which is moving in the direction of the arrow of FIG. 2. Thus, the lower run of the chain 30 will be moving upwardly from the lower end of the arm 26 and will continue rolling up the sod. To assist the chain in engaging the roll of sod, the chain 30 may be provided with outwardly projecting lugs 46 at regularly spaced intervals along the chain. The bottom run of the chain 30 is maintained tight by the idler 44, and the angle of the arm 26 is designed so that as the sod rolls up and the diameter of the roll thus increases, it will always be in engagement with the chain 30.

Figure 4:
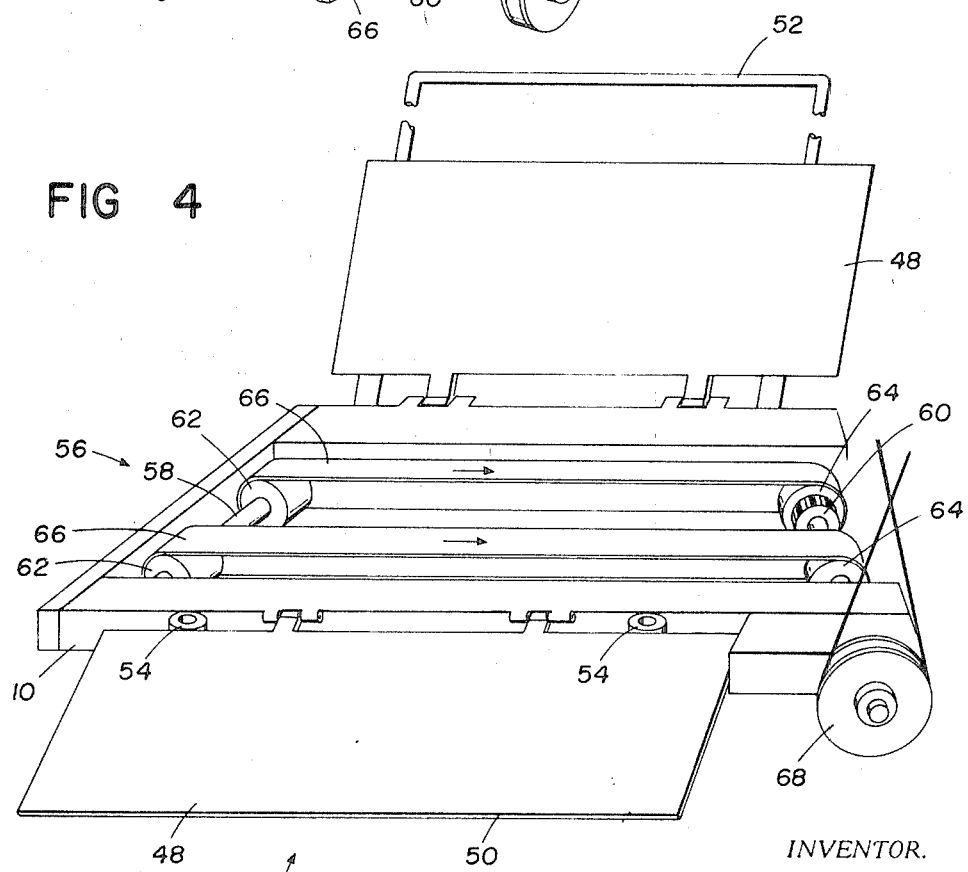
FIG. 4 is a perspective view of a part of the conveying portion of the apparatus which transfers the rolled sod sections to the side of the machine.
Figure 5:
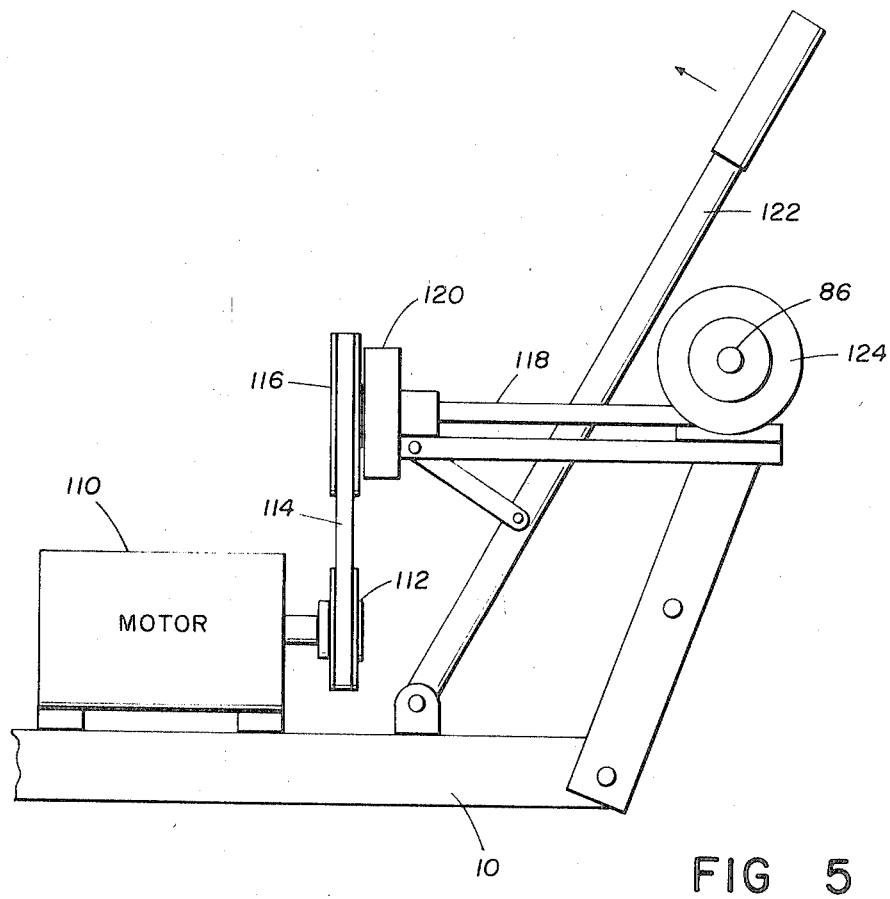
FIG. 5 is a side elevational view of the main clutch portion of the drive mechanism for the machine.

The sod is normally cut in strips of a predetermined length. As the roll formed from a precut strip is completed, it will continue to be rolled by movement of the chain 30 up onto an apron 48 (FIGS. 1 and 4) which is pivotally secured to the chassis 10. The chain 30 should be driven at a speed two-and-one-half to three times the speed of the machine itself so that a roll of sod will be moved out of the way of the next roll. An apron 48 is pivotally secured along opposite sides of the chassis 10 as best seen in FIG. 4, and if the machine is moving in the direction of the arrow shown in FIGS. 1 and 4 the rearwardly extending apron has its outer edge 50 resting almost on the ground. The apron 48 on the front edge of the machine, however, has its outer edge extending upwardly so that the apron serves as a stop. To maintain the apron 48 in an upwardly extending position, a bar 52 having the shape of an inverted U has its legs resting in mounting brackets 54 which are affixed to the chassis 10, as best seen in FIG. 4. Thus, a roll of sod when completely rolled will be moved onto the apron 48 by the chain 30 and then into the area in the center of the machine. Movement of the roll of sod any further so that it would be moved off the chassis is prevented by the upwardly extending apron 48 at the front of the machine.

In the center of the chassis 10 between the two aprons 48 is positioned a first conveying means indicated generally by the reference numeral 56. The conveying means 56 consist basically of two spaced apart parallel shafts 58 and 60 extending between the frame members of chassis 10 as shown in FIG. 4. Secured to each of the shafts 58 and 60 are a pair of belt pulleys 62 and 64, respectively, and between each pair of pulleys 62 and 64 is an endless conveyor belt 66. At the outer end of shaft 60 is a drive pulley 68 which is power-driven in a manner more fully described hereinafter so as to rotate shaft 60, pulleys 64 and 66. Thus, a roll of sod which is moved into the central area of the chassis 10 by the conveyor chain 30 will engage the belts 66 which are driven in a direction so as to move the roll of sod from left to right (FIG. 4).

Figure 3:
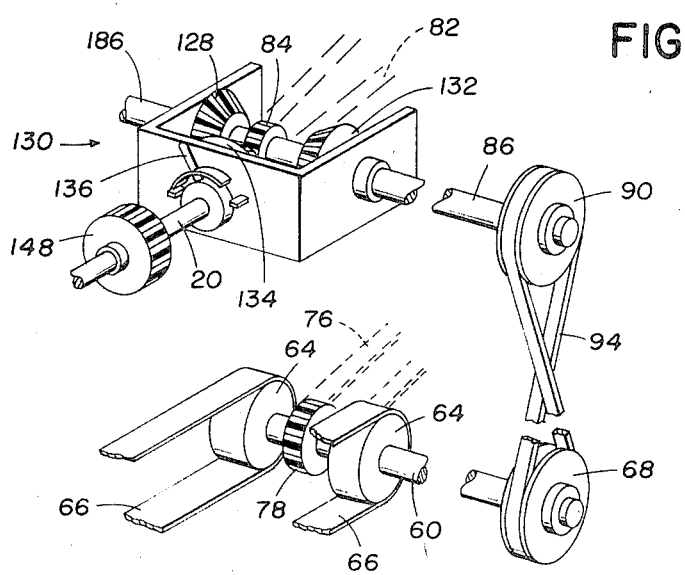
FIG. 3 is a view in perspective of that portion of the drive mechanism of the apparatus which provides for change in direction of travel of the machine.
Figure 10:
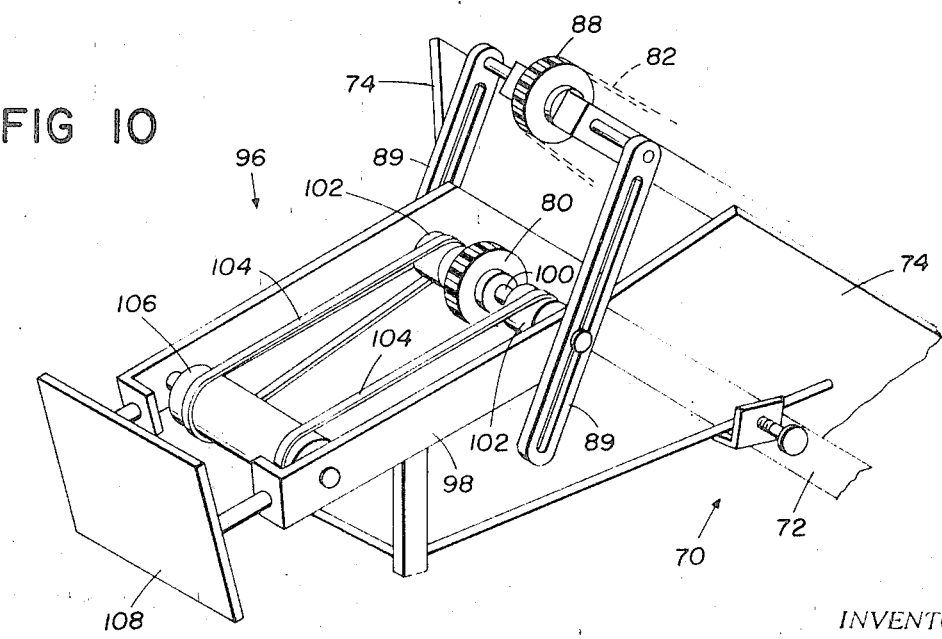
FIG. 10 is a perspective view of the outer end of the final conveyor for moving the rolled sod from the discharge end of the lifting conveyor into the vehicle.

When a roll of sod has been first rolled and then picked up and conveyed to the side of the machine by the first conveying means 56, it is desirable that the roll be lifted so that it can be easily placed into a vehicle for transportation to the job site. The rolls of sod are somewhat heavy, and I have thus provided an elevating conveyor which is indicated generally by the reference numeral 70 (FIG. 1). The elevating conveyor 70 can be of any suitable design, but preferably the conveyor includes a suitable frame 72 which extends upwardly and outwardly from the discharge end of the first conveying means 56 terminating at a height sufficient to allow a roll of sod to be discharged into a truck or other vehicle. If desired, the lower end of the frame 72 may be pivotally secured to the chassis 10 in any suitable manner so that the height of the discharge end of the conveyor can be varied. The frame 72 supports longitudinally extending side guides 74 which are spaced apart a sufficient distance to receive a roll of sod. The guides 74 are preferably curved inwardly toward the center of the conveyor 70, but the conveyor 70 is open along the bottom from the lower end to the discharge end so as to receive in the opening an endless lower conveyor chain 76. Conveyor chain 76 is driven by a sprocket 78 (FIG. 3) at the lower end of the conveyor, which sprocket is affixed to the shaft 60 which is also the drive shaft for the first conveying means 56. At the upper end or discharge end of the conveyor 70 there is provided a second sprocket 80 (FIG. 10) also engageable with the conveyor chain 76. The chain 76 is preferably similar to chain 30 and is thus preferably provided with spaced apart lugs extending outwardly along the length of the chain. The conveyor 70 is also provided with an upper conveyor chain 82 which is driven by a drive sprocket 84 (FIG. 3) that is fixed to and rotatable with the main power shaft 86. The upper chain 82 is also engageable with an upper sprocket 88 that is mounted on adjustable supports 89 for rotatable movement at the upper or discharge end of the conveyor 70 as best seen in FIG. 10. The upper chain 82 is positioned above the conveyor 70 at a height so as to be engageable with a roll of sod. The slotted supports 89 allow the upper sprocket 88 to move up and down depending on the size of the sod roll being handled. Thus, a roll of sod discharged from the first conveying means 56 will be engaged on both top and bottom by the two conveyor chains 76 and 82 so that the roll of sod will be carried easily up along the guides 74 to the discharge end of the conveyor 70. Obviously, the two chains 76 and 82 must be driven at the same speed, and the details of the drive will be described hereinafter in connection with the drive arrangement for the entire machine. However, from FIG. 3, it will be evident that the two shafts 60 and 86 are driven at the same speed but in opposite directions. This is made possible by the belt pulley arrangement shown in FIG. 3 in which the drive pulley 90 that is affixed to the shaft 86 is the same size as the drive pulley 68 affixed to the lower shaft 60, the drive pulleys being connected by a drive belt 94 which is crossed over as shown so that the shafts 60 and 86 are driven in opposite directions.

Once a roll of sod has been elevated to the top of the conveyor 70, it would normally be lifted manually and placed in the truck. Since the rolls of sod are somewhat fragile and since if they are dropped they can become unrolled, I prefer to provide at the discharge end of the conveyor a means for receiving a roll of sod and temporarily holding it until it can be manually lifted into a truck. This holding conveyor 96 moves the roll of sod out of the way of the conveyor chains 76 and 82 so that the lugs on them do not tear the sod. As shown in FIG. 10, the holding conveyor 96 consists of a supporting frame 98 which serves also as a support for the shaft 100 to which is affixed the sprocket 80. Also affixed to the same shaft 100 are a pair of small pulleys 102 which are connected by belts 104 to roller 106. The belts 104 serve to move the roll of sod from the discharge end of conveyor 70 until the roll strikes a stop member 108 secured at the outer end of the frame 98. The sod can then rest in this position without being damaged by the moving belts 104. From this position against the stop 108, the roll of sod can be manually removed and placed in the truck for transportation to the site.

From the description thus far, it is evident that my machine is capable of rolling up a precut strip of sod, moving the roll onto the machine and then conveying and elevating it so that it can be easily and manually placed in a vehicle for transportation to the job site. The drive mechanism for driving the various conveyors and also for propelling the machine itself will now be described.

The machine is a self-propelled machine and is preferably driven by a motor 110, such as an internal combustion engine that is mounted on the chassis 10 to the side of the machine. The motor 110 is positioned on the right front of the machine as it is viewed in FIG. 1. The motor 110 drives a main drive pulley 112 which is connected by belt 114 to a second pulley 116 which is operatively connected to a drive shaft 118 through clutch 120. By means of the operating handle 122 the clutch 120 will engage and disengage the motor 110 from a gear box 124 which permits the power to be transmitted at right angles from the drive shaft 118 to the main power shaft 86 (see FIG. 3). The main power shaft 86 has affixed to it a beveled gear 128 which is a part of a reversible drive mechanism indicated generally by the reference numeral 130. The main power shaft 86 is the shaft which drives the first conveying means 56 through shaft 60 and which also drives the elevating conveyor 70 through sprocket 84. Thus, the elevating conveyor 70 is continuously driven at all times that the clutch 120 is engaged. Also, since shaft 86 is connected to the belt pulley arrangement shown in FIG. 3 to shaft 60, the lower chain 76 of conveyor 70 is also continuously driven but in the opposite direction. Shaft 60 also drives the first conveying means 56 so that these two conveyors are continuously operating any time the clutch 120 is engaged. Also included in the reversible drive mechanism is a second beveled gear 132 which is affixed to shaft 86 and is, therefore, rotatable at the same speed and simultaneously with gear 128. Located between the two gears on shaft 20 is a third beveled gear 134, shaft 20 being positioned at right angles to shafts 86 and 126.

However, the gear 134 and its shaft 20 are eccentrically mounted with respect to the two beveled gears 128 and 132 so that by movement of the lever 136 in one direction the gear 134 will be disengaged from gear 128 and engaged with gear 132 and by movement of lever 136 in the opposite direction, gear 134 will be disengaged from gear 132 and engaged with gear 128. This provides for reversing the direction of rotation of shaft 20 which is the drive shaft for the sod roller mechanism 18. Thus, the reverse drive mechanism 130 is provided so that the sod roller mechanism 18 can be driven in the proper direction depending upon the direction of movement of the machine. However, regardless of the position of the gear 134, the first conveying means 56 and the elevating conveyor 70 will always be driven in the same direction.

As previously mentioned, the machine is designed so that it can be pulled over the road without violating width regulations. The machine is also designed so that it can be propelled under its own power when used in the field. To accomplish this, it is necessary that the wheels of the machine be movable depending on the direction the machine is moving. FIG. 1 shows the wheels of the machine in position for use in the field when the machine is self-propelled. When in this position, wheel 12 is rotatably secured to the chassis 10 in any suitable manner. When pulled over the road, however, wheel 12 must be removed or rotated 90°. I prefer to remove the wheel so that that portion of the chassis to which the wheel 12 was secured can then be secured to a prime mover for towing over the road.

Figure 6:
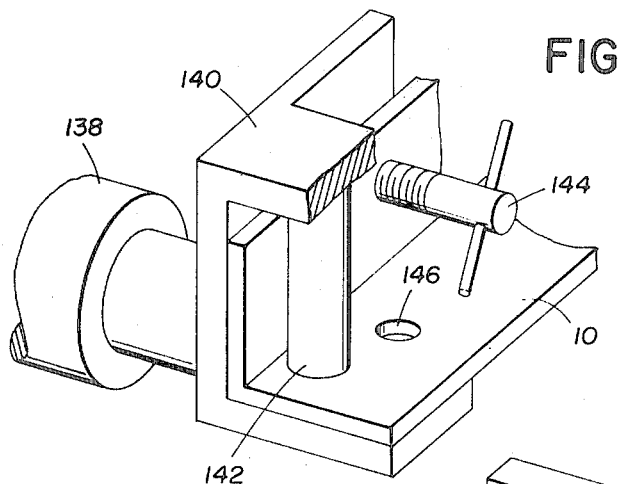
FIGS. 6 and 7 are perspective views showing the mounting for one of the ground wheels which allows the wheel to be swung and locked in place at two positions 90° from each other.
Figure 7:
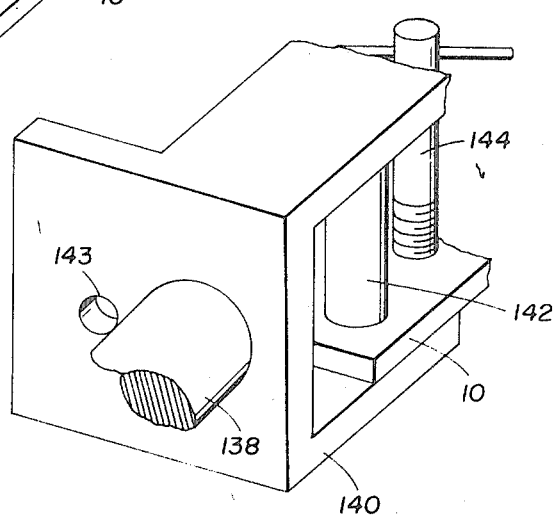

When the vehicle is being used in the field, wheel 14 is in the position shown in FIG. 1 which is also the position shown in FIG. 6. In FIG. 6 the axle 138 for wheel 14 is rotatably mounted with respect to the chassis 10. However, the wheel 14 is also mounted so that it can be pivoted 90°. To achieve this, the axle 138 is rotatably mounted with respect to a support member 140 which is pivotally connected to chassis 10 by means of the pivot pin 142. To secure the support member 140 to the chassis 10 when the wheel 14 is in a position to be used in the field, a threaded member 144 is threaded into opening 143 in the support member 140 to join it to the chassis 10. However, when the machine is to be towed over the road, the wheel 14 thus rotated 90° from the position shown in FIG. 1, the threaded member 144 is removed from its position shown in FIG. 6 and the support member 140 then pivoted 90° on the pivot pin 142 to the position shown in FIG. 7. The threaded member 144 is then threaded through an opening 146 in the chassis 10 into a corresponding opening (not shown) in the support member 140 to secure it to the chassis 10. With this very simple arrangement, the wheel 14 can be moved between the two positions and locked in place in a matter of a very few minutes.

Figure 8:
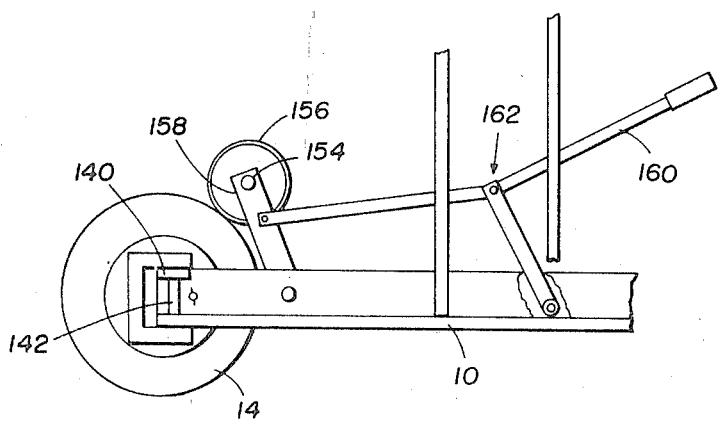
FIG. 8 is a side elevational view of a portion of the operating mechanism for engaging and disengaging the drive for propelling the machine.

In FIG. 8, there is shown a portion of the machine including wheel 14 which is shown in the same position as the wheel is shown in FIG. 1, namely, in a position for the machine to be operated in the field. FIG. 8 illustrates the manner in which the machine is driven when in the field. Secured to and rotatable with the drive shaft 20 is a sprocket 148 (FIGS. 1 and 3) which through chain 150 drives the sprocket 152. The sprocket 152 in turn is secured to shaft 154 the other end of which is connected to the friction drive wheel 156. Shaft 154 extends outwardly beyond the friction drive wheel 156 and is affixed to an upright arm 158 which in turn is pivotally mounted on the chassis 10. The arm 158 is connected to an operating lever 160 through an over-the-center linkage arrangement 162 in such a way that the friction drive wheel 156 can be engaged and disengaged from the wheel 14. Since the shaft 154 and thus the friction drive wheel 156 will be rotatably driven at all times that the main clutch 120 is engaged, the operator need only operate the lever 160 to control movement of the machine. It should be noted that the shaft 154 is driven from the shaft 20 the direction of which can be reversed depending upon the direction it is desired to move the machine. Thus, provision is very simply made for movement of the machine in either forward or reverse direction.

Figure 9:
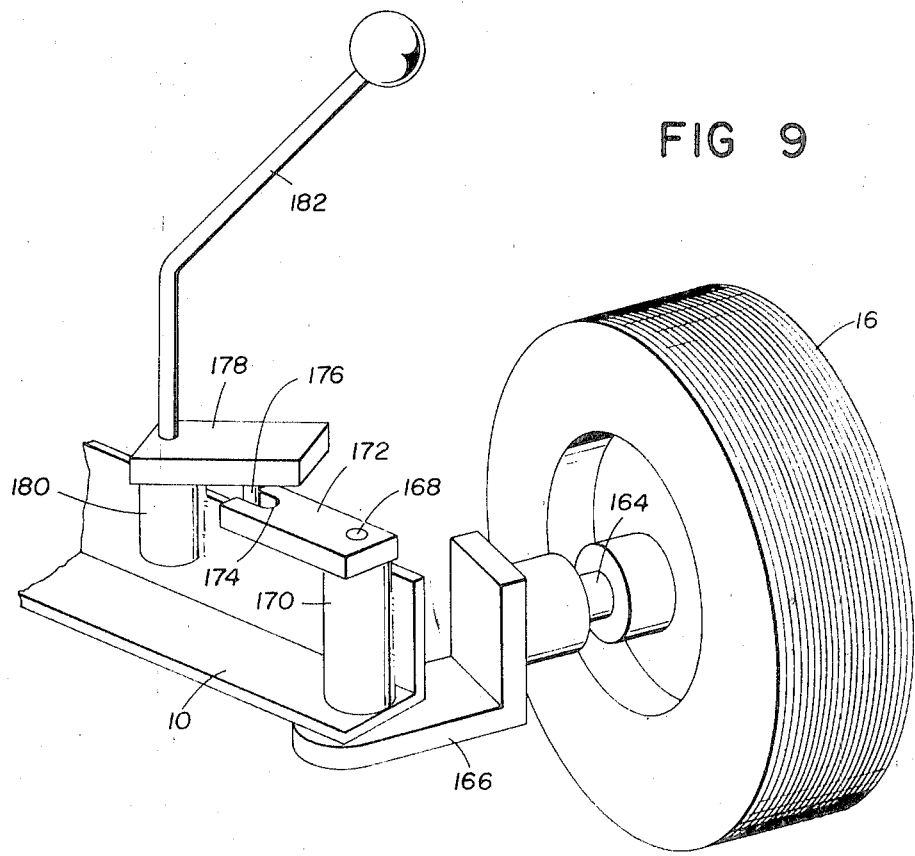
FIG. 9 is a perspective view of the steering mechanism for the machine.

In order to control the direction of the machine, I prefer to steer the machine by controlling movement of the ground wheel 16. The ground wheel 16 is not visible in FIG. 1 but is positioned on the chassis 10 on the right front corner of the machine as it is viewed in FIG. 1. As shown in FIG. 9, the ground wheel 16 is rotatably mounted on an axle 164 which is, in turn, secured to a supporting member 166 that is pivotally mounted with respect to the chassis 10 by the pivot pin 168. Note that the pin 168 is not movable relative to the support member 166 but rather is turnable in a bushing 170 which is fixed to the chassis 10. There is secured to the upper end of the pivot pin 168 an arm 172 containing a centrally located slot 174 in its outer end. A control pin 176 depends from a control arm 178 which is in turn mounted for pivotal movement in a bushing 180 secured to chassis 10. An operating lever 182 is also secured to the control arm 178 in order to pivot the arm. From this arrangement, it can be seen that as the operating arm 182 is moved thus turning the control arm 178, the control pin 176 will cam the arm 172 so as to cause the pivot pin 168 to rotate and thus turn the wheel 16. Obviously, any other suitable turning mechanism could also be used for the machine but the one I have shown is very simple.

All of the various operating levers 160, 182 and 122 are located within easy reach of an operator positioned on a seat 184 (FIG. 1). Thus, a single operator can very easily control all of the various functions of the machine from this one position.

The basic detailed operation of the machine should be evident from the foregoing description. However, to summarize, if it is desired to move the machine in the direction of the arrow of FIG. 1, the ground wheel 14 should be turned to the position shown in FIG. 1 and, of course, the other ground wheel 12 should be mounted in place. The sod rolling mechanism 18 should be pivoted on the shaft 20 so that it extends outwardly to the rear of the machine. The lever 136 for the reversible drive mechanism is moved to a position so that the sod roller mechanism 18 is driven in the proper direction. By engaging the main clutch 120, the sod roller mechanism 18 is started as well as the first conveying means 56 and the elevating conveyor 70. The operator then moves the operating lever 160 so as to engage the friction drive wheel 156 with the ground wheel 14 and the machine will move along a path controlled by the operator by movement of the steering lever 182. If for any reason it is necessary to reverse the direction of the machine from that indicated by the arrow of FIG. 1, all that is necessary is for the operator to remove the bar 52 and allow the apron 48 to swing downwardly. The operator can then manually lift the sod roller mechanism 18 so that it pivots about shaft 20 until the sod roller mechanism extends to the end of the machine opposite to that shown in FIG. 1. The apron 48 on the opposite side of the machine is then raised and the bar 52 placed in the mounting opening 54 so as to maintain the apron 48 in an upright position. The operator then reverses the drive by movement of the control lever 136 and the machine is ready to operate in the opposite direction by engaging the main clutch 120 and the friction drive wheel 156.

From the above description, it will be evident that I have designed a machine that is very simple, uses a minimum number of parts but still does a very effective and relatively fast job of harvesting sod. The machine is simple so that it requires a minimum amount of maintenance, and it is adapted to operating in both directions and, therefore, can be used in small fields or fields enclosed with fencing in which it would otherwise be impossible to harvest sod that can be cut by the usual sod cutters. The machine eliminates much of the back breaking work of hand rolling and lifting of the sod onto a truck for transportation to the job site. The machine can be easily and quickly adapted for over the road towing by the same truck that is used to haul the sod by merely removing one of the ground wheels and connecting the machine to the hitch on the truck after the other ground wheels are rotated 90°. Of course, only a preferred embodiment of the invention has been illustrated and there are other ways in which to construct the machine. It will also be obvious to those skilled in the art that various revisions and modifications and changes can be made in the preferred embodiment shown herein without departing from the spirit and scope of the invention. It is my intention, however, that all such revisions and modifications as are obvious to those skilled in the art will be included within the scope of the following claims:

I claim:

1. In an apparatus for forming rolls of cut strips of sod and the like, having a frame, ground engaging wheels rollably supporting said frame for movement along the ground, means for propelling said apparatus, sod rolling means carried by said frame, and sod roll conveying means, the improvement in said sod rolling means comprising an arm pivotally supported at one end on said frame and extending outwardly and downwardly and in a direction opposite to the direction of travel of said apparatus, a shaft at the lower end of said arm rotatable about an axis generally transverse to the direction of travel of the apparatus, a rotatable member on said shaft, an endless member supported by said arm and engageable with said rotatable member and movable in a direction longitudinally of said arm, a rotatable sod roll starting member affixed to said shaft on each side of said endless member, a stationary lifting shoe on the lower end of said arm beneath and at the outer end of said endless member, said shoe being adapted to engage the cut end of a strip of sod and lift it so that it can be easily engaged by said roll starting member, drive means to drive said endless member and said roll starting member in a direction opposite to the direction of rotation of said wheels so as to roll a cut strip of sod, and an upwardly inclined ramp carried by said frame beneath said endless member between its upper and lower ends, said sod roll conveying means being located forwardly of said ramp and operable to move a roll of sod transversely of the direction of movement of the apparatus, said endless member and ramp cooperating to receive the roll of sod and lift it onto said sod roll conveying means.

2. The apparatus of claim 1 in which said endless member is a chain, and said rotatable member is a sprocket, and a second sprocket is provided at the upper end of said arm and is engageable with said chain, said chain serving to drive said sod roll starting members.

3. The apparatus of claim 2 in which said sod roll starting members each consist of a rotatable disc having a plurality of axially extending pins affixed to said disc around its periphery.

4. The apparatus of claim 3 in which there is secured to said shaft adjacent to each of said sod roll starting members a paddle wheel the outer diameter of which is substantially the same as the outer diameter of said sod roll starting members.

5. The apparatus of claim 1 in which each of said stationary lifting shoes includes a lifter plate extending somewhat vertically with respect to the ground, said lifter plate being vertically adjustable.

6. An apparatus for forming rolls of cut strips of sod and the like, said apparatus comprising a frame, ground engaging wheels rollably supporting said frame for movement along the ground, means for propelling said apparatus, sod rolling means carried by said frame, said sod rolling means including an arm pivotally supported at one end on said frame and extending outwardly and downwardly in a direction opposite to the direction of travel of the apparatus, an endless movable member supported by said arm and movable in a direction longitudinally of said arm, sod roll starting means affixed to said arm at its outer end, drive means to drive said endless member and said sod roll starting means in a direction opposite to the direction of rotation of said wheels so as to roll a cut strip of sod, an inclined ramp pivotally mounted on said frame beneath said endless member between its upper and lower ends, conveying means forwardly of said ramp and operable to move a roll of sod transversely of the direction of movement of the apparatus, said endless member and ramp cooperating to receive the roll of sod and lift it onto said conveying means, a second ramp pivotally mounted on said frame on the side of said conveying means opposite to the said first ramp, and means to hold a selected one of said ramps in a position with its outer end swung upwardly to serve as a stop for a roll of sod lifted onto said conveying means, the pivotal mounting for said arm being so located with respect to said conveying means as to allow said arm and endless member to be swung to a position with the lower end on either side of said conveying means.

7. The apparatus of claim 6 in which the pivotal mounting for said arm is a shaft, said shaft also serving as the drive shaft for said endless member, and power means is provided to drive said shaft, said power means also serving to propel the apparatus.

8. The apparatus of claim 7 in which there is provided a drive unit connecting said shaft and said power means, said drive unit including means to selectively reverse the direction of rotation of said shaft.

9. The apparatus of claim 8 in which said conveying means is driven from said power means through said drive unit, said drive unit including means to cause said conveying means to be driven in the same direction at all times when said power means is operable, regardless of the direction of movement of the apparatus.

* * * * *